US009020895B1

(12) United States Patent
Rajashekar et al.

(10) Patent No.: US 9,020,895 B1
(45) Date of Patent: Apr. 28, 2015

(54) DISASTER RECOVERY FOR VIRTUAL MACHINES ACROSS PRIMARY AND SECONDARY SITES

(75) Inventors: Rajesh Rajashekar, Sunnyvale, CA (US); Atul Bhalodia, Research Triangle, NC (US); Anagha Barve, Sunnyvale, CA (US); Vineeth Karinta, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/335,427

(22) Filed: Dec. 22, 2011

Related U.S. Application Data

(60) Provisional application No. 61/427,439, filed on Dec. 27, 2010.

(51) Int. Cl.
G06F 7/00 (2006.01)
G06F 17/00 (2006.01)
G06F 17/30 (2006.01)

(52) U.S. Cl.
CPC .................. *G06F 17/30008* (2013.01)

(58) Field of Classification Search
USPC ........................................................ 707/639
See application file for complete search history.

(56) References Cited

U.S. PATENT DOCUMENTS

| | | | |
|---|---|---|---|
| 7,739,540 B2 * | 6/2010 | Akutsu et al. ...................... 714/3 |
| 7,802,137 B2 * | 9/2010 | Kawamura et al. ............. 714/20 |
| 7,890,793 B1 * | 2/2011 | Mohl ................................ 714/3 |
| 8,117,496 B2 * | 2/2012 | Bashir et al. .................... 714/12 |
| 8,261,282 B1 * | 9/2012 | Ponnapur et al. ............. 718/105 |
| 2006/0085792 A1 * | 4/2006 | Traut ............................. 718/100 |
| 2007/0088925 A1 * | 4/2007 | Shinozaki et al. ............. 711/162 |
| 2008/0104135 A1 * | 5/2008 | Kawamura et al. ............ 707/201 |
| 2008/0189468 A1 * | 8/2008 | Schmidt et al. .................... 711/6 |
| 2009/0198949 A1 * | 8/2009 | Kuligowski et al. ........... 711/203 |
| 2009/0210427 A1 * | 8/2009 | Eidler et al. ..................... 707/10 |
| 2009/0307166 A1 * | 12/2009 | Routray et al. .................. 706/46 |
| 2009/0313503 A1 * | 12/2009 | Atluri et al. ...................... 714/19 |
| 2010/0049798 A1 * | 2/2010 | McCabe et al. ................ 709/203 |
| 2010/0054120 A1 * | 3/2010 | Beeken et al. .................. 370/221 |
| 2010/0077162 A1 * | 3/2010 | Kaneko et al. ................. 711/162 |
| 2010/0121824 A1 * | 5/2010 | Kawamura et al. ............ 707/683 |
| 2010/0169591 A1 * | 7/2010 | Atluri et al. .................... 711/162 |
| 2010/0211829 A1 * | 8/2010 | Ziskind et al. ................... 714/48 |
| 2010/0228819 A1 * | 9/2010 | Wei ............................... 709/203 |
| 2010/0274767 A1 * | 10/2010 | Irisawa et al. .................. 707/654 |
| 2010/0325500 A1 * | 12/2010 | Bashir et al. ................... 714/746 |
| 2011/0022812 A1 * | 1/2011 | van der Linden et al. .... 711/163 |
| 2011/0078494 A1 * | 3/2011 | Maki et al. .................... 714/6.12 |

* cited by examiner

*Primary Examiner* — Robert Beausoliel, Jr.
*Assistant Examiner* — Nicholas Allen
(74) *Attorney, Agent, or Firm* — DeLizio Gilliam, PLLC

(57) ABSTRACT

A processing system stores a backup of virtual machine data on a storage device in a primary network storage system. A virtual machine running on a primary host machine, which is coupled to the primary network storage system, generates the virtual machine data. A replication software module replicates the backup of the virtual machine data from the primary network storage system to a secondary network storage system. In the event of a failure on the first network storage system, disaster recovery services module restores the virtual machine data from the secondary network storage system to cause the virtual machine to run on a secondary host machine coupled to the secondary network storage system, wherein the disaster recovery services module is coupled to the primary host machine and the secondary host machine over a network.

22 Claims, 8 Drawing Sheets

DISASTER RECOVERY FOR VIRTUAL MACHINES ACROSS PRIMARY AND SECONDARY SITES

RELATED APPLICATION

This application claims the benefit of U.S. Provisional Patent Application No. 61/427,439 filed Dec. 27, 2010, which is incorporated herein by reference.

TECHNICAL FIELD

This invention relates to the field of virtualization systems and, in particular, to disaster recovery for virtual machines across primary and secondary sites.

BACKGROUND

Virtualization is an abstraction that decouples the physical hardware from the operating system in a data processing system to deliver greater resource utilization and flexibility. Virtualization allows multiple virtual machines with heterogeneous operating systems (e.g., Windows™, Linux™, UNIX™, etc.) and applications to run in isolation, side-by-side on the same physical host machine. A virtual machine is the representation of a physical machine by software. A virtual machine has its own set of virtual hardware (e.g., random access memory (RAM), central processing unit (CPU), network interface card (NIC), hard disks, etc.) upon which an operating system and applications are loaded. The operating system sees a consistent, normalized set of hardware regardless of the actual physical hardware components.

A conventional virtualized processing system may include a physical host machine which rims virtualization software such as a hypervisor. The hypervisor software runs on the physical host machine (e.g., a computer) and abstracts physical hardware (e.g., processors, memory, storage and networking resources, etc.) to be provisioned to one or more virtual machines.

A guest operating system (e.g., Windows™, Linux™, UNIX™, etc.) may be installed on each of the virtual machines. The virtualization software presents the physical hardware of the host machine as virtual hardware to the guest operating system and applications running in the guest operating system. A user may access the virtual machine to perform computing tasks as if it were a physical machine. Generally, the virtualization process is completely transparent to the user.

Virtual machines may be backed up on a network storage system attached to the physical host running the virtual machine. For example, a persistent point-in-time image of the virtual machine may be captured and stored in the network storage system. Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc. A network-based storage system typically includes at least one storage server, which is a processing system configured to store and retrieve data on behalf of one or more client processing systems (client devices). In the context of NAS, a storage server may be a file server, which operates on behalf of one or more clients to store and manage shared files. The files may be stored in a storage system that includes one or more arrays of mass storage devices, such as magnetic or optical disks or tapes, by using a data storage scheme such as Redundant Array of Inexpensive Disks (RAID). In a SAN context, a storage server provides clients with block-level access to stored data, rather than file-level access. Some storage servers are capable of providing clients with both file-level access and block-level access. In the event of a disaster, the backup snapshot of the virtual machine stored on the storage system may be lost. The disaster may cause the loss of data and/or functionality on the host machine, on the storage system, or on both. Such a disaster would prevent recovery of data and preclude restoration of the virtual machine because the backup data stored in the storage system may no longer be accessible.

SUMMARY OF THE INVENTION

A processing system stores a backup of virtual machine data on a storage device in a primary network storage system. A virtual machine running on a primary host machine, which is coupled to the primary network storage system, generates the virtual machine data. A replication software module replicates the backup of the virtual machine data from the primary network storage system to a secondary network storage system. In the event of a failure on the first network storage system, a disaster recovery services module restores the virtual machine data from the secondary network storage system to cause the virtual machine to run on a secondary host machine coupled to the secondary network storage system, wherein the disaster recovery services module is coupled to the primary host machine and the secondary host machine over a network.

BRIEF DESCRIPTION OF THE DRAWINGS

The present invention is illustrated by way of example, and not by way of limitation, in the figures of the accompanying drawings.

DETAILED DESCRIPTION

Figure 1:
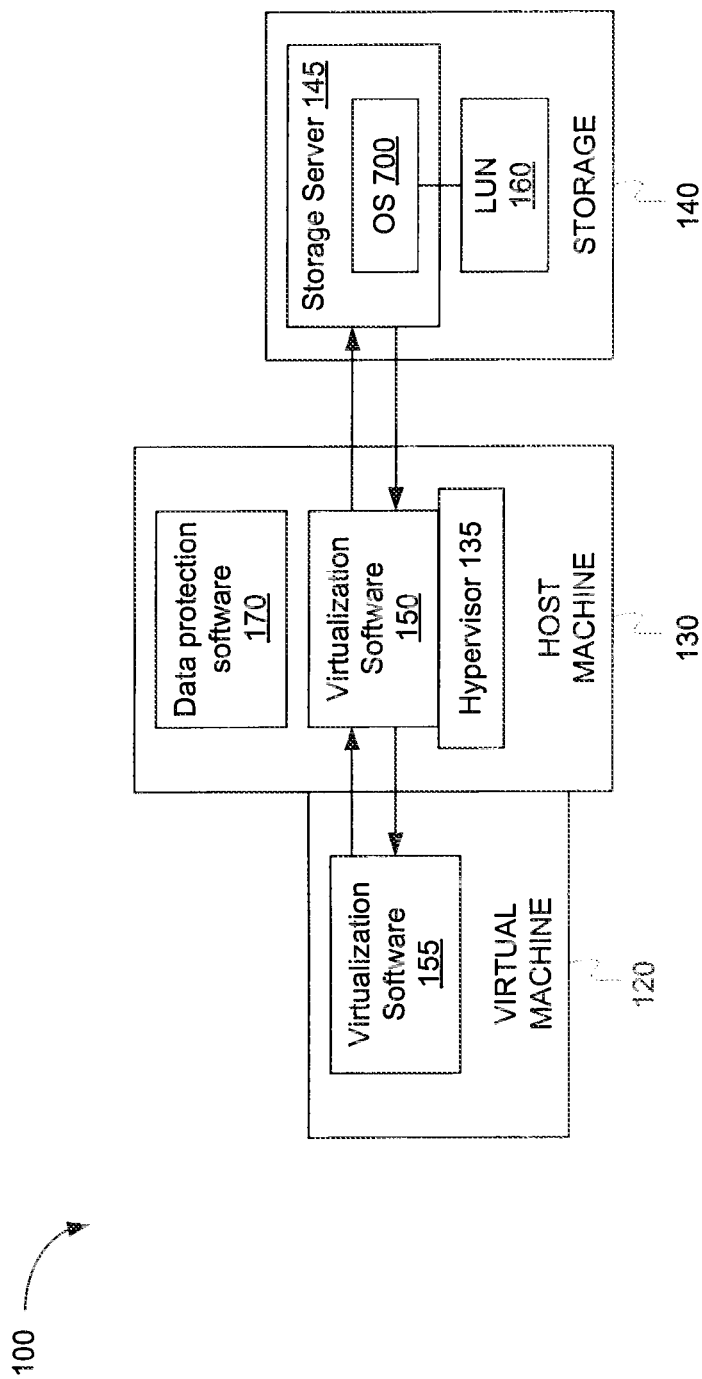
FIG. 1 is a block diagram illustrating a network environment in which disaster recovery may be implemented according to an embodiment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The present invention enables a disaster recovery solution for virtual machines making use of network storage systems. In a disaster recovery system, a virtual machine runs on a primary host machine, which is coupled to a primary network storage system. A virtual machine disaster recovery services module manages disaster recovery operations in the system. The disaster recovery services may be accessible by the rest of the system over a network, such as the Internet. At the direction of the disaster recovery services, data protection software running on the primary host machine backs up virtual machine data from the virtual machine on the primary network storage system. The disaster recovery system also includes a secondary host machine and a secondary network storage system. The secondary host machine and secondary network storage system may be at different location than the primary site. At the direction of the disaster recovery services, replication software in the network storage systems replicate the backup of the virtual machine data from the primary network storage system to the secondary network storage system. In the event of a disaster causing the primary host machine or the primary network storage system to fail, at the direction of the disaster recovery services data protection software on the secondary host machine restores the virtual machine data. The disaster recovery services identifies the host name of the secondary host machine and uses the host name in a restore to alternate host operation, or calls the data protection software to perform the restore operation, restoring the virtual machine to nm on the secondary host machine. The alternate host name may be found, for example, in a disaster recovery plan provided by the disaster recovery services.

The present invention enables disaster recovery according to application consistent recovery of virtual machines using network storage systems. The data protection software automates the process of disaster recovery, preventing a system administrator from having to manually restore the virtual machines. The disaster recovery solution provides an almost instant recovery of virtual machine data and prevents the loss of mission critical data in a virtualized computing environment. The disaster recovery solution restores a virtual machine on an alternate host (provided by disaster recovery services from the disaster recovery plan), despite metadata stored with the backup of the virtual machine indicating a different host machine. The disaster recovery ignores the identifier of the original host machine and performs a restore operation with an identifier for the alternate host machine.

FIG. 1 is a block diagram illustrating a network environment in which disaster recovery may be implemented according to an embodiment of the present invention. The network environment 100 includes physical host machine 130 and network storage system 140. In one embodiment, network storage system 140 is a storage area network (SAN). Network storage system 140 may include a storage server 145 configured to store and retrieve data. Network storage system 140 operates to store and manage shared storage objects (e.g., files) in a set of mass storage devices, such as magnetic or optical disks or tapes, or flash drives. The mass storage devices may be organized into one or more volumes of a Redundant Array of Inexpensive Disks (RAID). In a SAN context, the storage server 145 provides block-level access to stored data, rather than file-level access.

Host machine 130 may be a physical computer having a processor to execute instructions stored in memory. Host machine 130 may run a hypervisor 135, such as for example, Hyper-V in the Microsoft Windows Server® 2008 R2 operating system. Hypervisor 135 enables host machine 130 to host one or more virtual machines, each running its own operating system. Host machine 130 also runs data protection software 170. Data protection software enables backup and recovery of the virtual machines by making use of persistent point-in-time images, sometimes referred to as "snapshots." In one embodiment, data protection software 170 includes NetApp® SnapManager® for Hyper-V (SMHV), developed by NetApp, Inc. of Sunnyvale, Calif. In one embodiment, host machine 130 also runs virtualization software 150 which may enable the provisioning of storage from the network storage system 140 for the virtual machines. In one embodiment, virtualization software 150 includes NetApp® SnapDrive® for Windows (SDW), developed by NetApp, Inc. One of the virtual machines may be virtual machine 120. In one embodiment, virtual machine 120 runs the same operating system as host machine 130. In other embodiments, virtual machine 120 may run a different operating system, such as for example, Microsoft Windows Server® 2003, 2008, or another operating system. Virtual machine 120 may also be running virtualization software 155.

In network environment 100, a user may desire to back-up virtual machine 120. Similarly, the back-up of the virtual machine may occur automatically at a scheduled interval or at the command of a system administrator. In one embodiment, the data protection software 170 initiates a request for a backup of virtual machine 120. Data protection software 170 generates the request for a backup of virtual machine 120 and sends the request to a volume shadow copy service (VSS) framework (not shown) in hypervisor 135. The VSS framework receives the backup request from data protection software 170 and manages the backup process. The VSS framework communicates with a VSS writer (not shown) to provide an application consistent backup snapshot. For example, when applications and services are running, the VSS writer responds to signals provided by the VSS framework to allow applications to prepare and quiesce their data stores for a backup operation (e.g., creation of a snapshot) and to prevent writes from occurring on the data while the snapshot is being created (e.g., writes are temporarily queued in memory). In one embodiment, preparing and quiescing the data includes completing all open transactions, rolling transaction logs, and flushing caches. In one embodiment, the VSS writer creates an XML description of the backup components and defines the restore process. The VSS framework receives notice from the VSS writer when the data is consistent and directs virtualization software 150 to create a snapshot. In one embodiment, virtualization software creates an application consistent snapshot on the storage system 140 using API's provided by the storage server 145.

Figure 7:
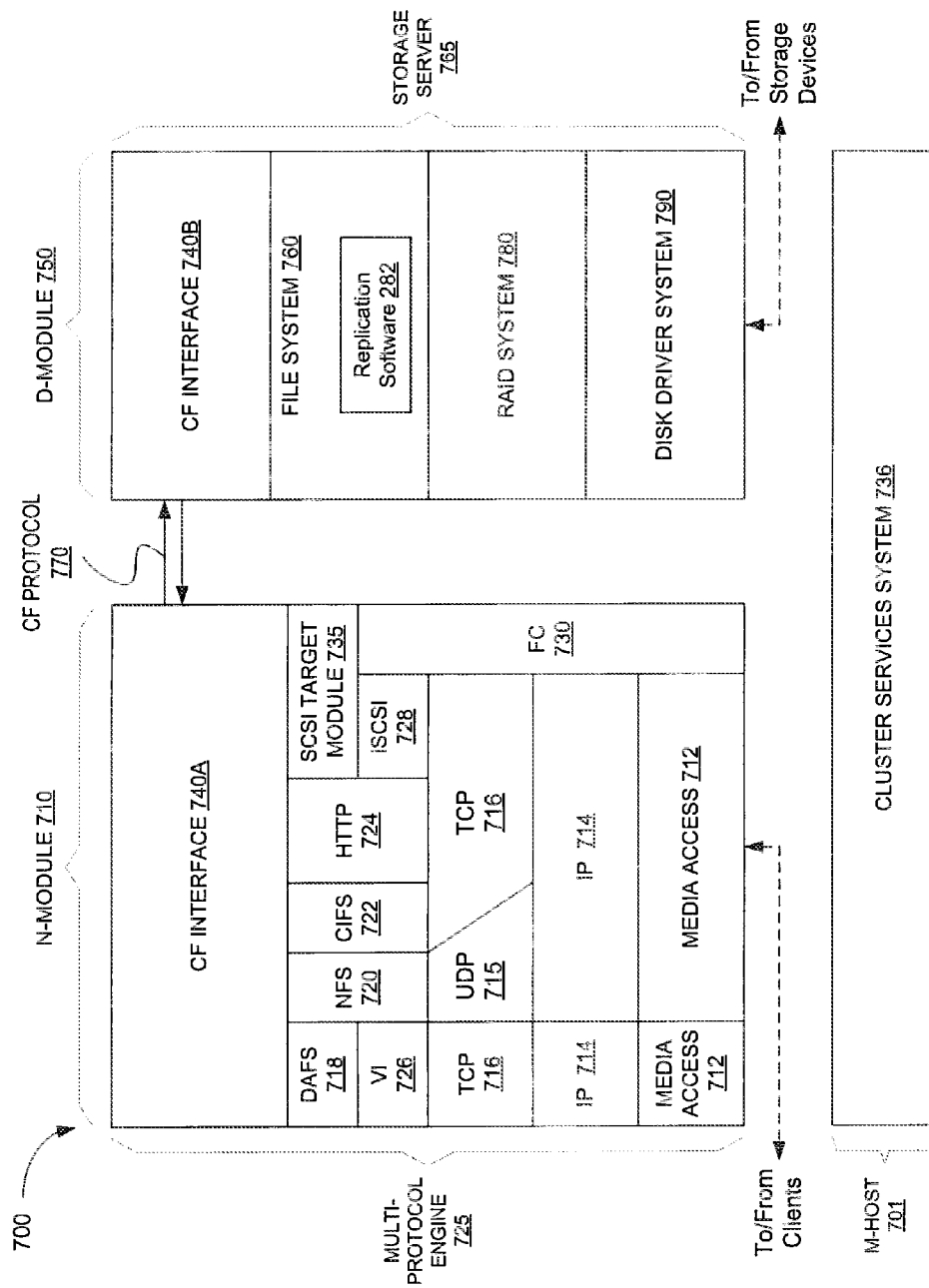
FIG. 7 is a block diagram illustrating the architecture of the operating system of the storage system in which disaster recovery may be implemented according to an embodiment.

In one embodiment, virtualization software 150 on the host machine 130 sends the snapshot to the network storage system 140. An operating system, such as operating system 700 as shown in FIG. 7, running on the storage server 145 of network storage system 140 stores the snapshot in storage, for example in a volume including Logical Unit Number (LUN) 160.

Figure 2:
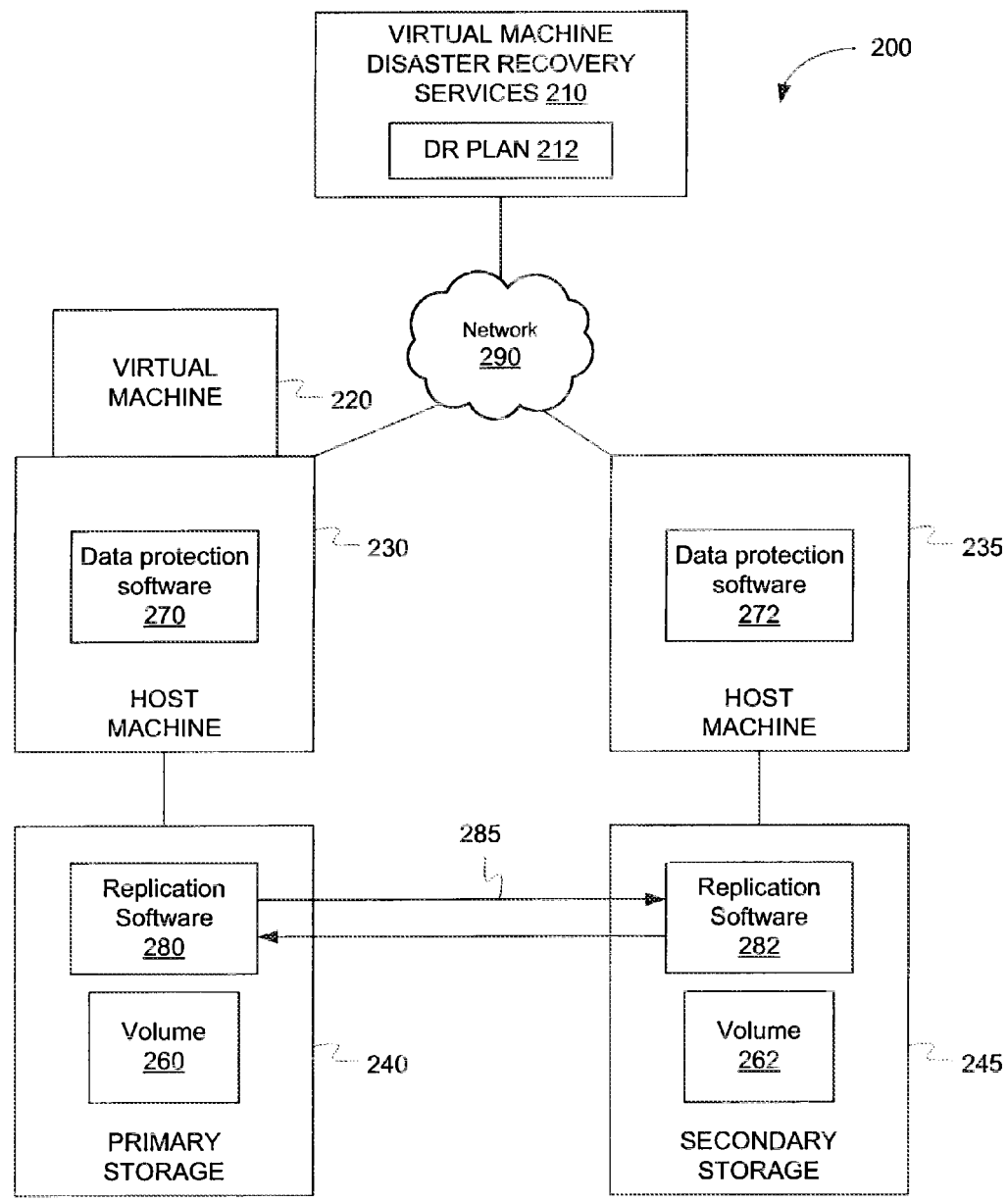
FIG. 2 is a block diagram illustrating a network environment in which disaster recovery may be implemented according to an embodiment.

FIG. 2 is a block diagram illustrating a network environment in which disaster recovery may be implemented according to an embodiment. In one embodiment, the network environment 200 includes virtual machine disaster recovery services 210, a primary host machine 230 and primary network storage system 240, and a secondary host machine 235 and secondary network storage system 245. Network environment 200 also includes at least one virtual machine 220 running on one host machine (e.g., primary host machine 230). Virtual machine disaster recovery (DR) services may be a set of services accessible over a network 290 by host machines 230, 235. Network 290 may be, for example, a local area network (LAN), wide area network (WAN), metropolitan area network (MAN), a global area network such as the Internet, a Fibre Channel fabric, or any combination of such interconnects. DR services 210 may manage the disaster recovery operations of network environment 200, including, for example, restore-to-alternate host, failover, failback, and other operations. DR services 210 may be a set of computer instructions and/or software modules running on a computing device managed for example, by a storage vendor. In one embodiment, each of host machines 230 and 235 include data protection software modules (270 and 272, respectively) running data protection software. In this embodiment, there are two physical host machines (230 and 235). Other embodiments, however, may include any number of physical host machines and/or virtual machines.

In one embodiment, each of primary network storage system 240 and secondary network storage system 245 include replication software modules 280, 282 running replication software. In one embodiment, the replication software includes NetApp® SnapMirror®, developed by NetApp, Inc. Replication software modules 280, 282 create a data protection relationship 285 between primary network storage system 240 and secondary network storage system 245. In one embodiment the data protection relationship 285 is a mirroring relationship, where data (e.g., volume 260) from primary network storage system 240 is mirrored (i.e., copied or replicated) to secondary network storage system 245 (e.g., as volume 262). In one embodiment, each of volumes 260, 262 may include one or more LUNs. Thus, data stored in primary network storage system 240 may be replicated in secondary network storage system 245. In one embodiment, for example, data protection software 270, as controlled by DR services 210, initiates an application consistent backup of virtual machine 220 (as described above with respect to FIG. 1), and stores the snapshot in primary network storage system 240. Replication software module 280, as controlled by DR services 210, replicates the snapshot to secondary network storage system 245. Secondary network storage system 245 may be at the same location as primary network storage system 240 or may be at a remote location to prevent both storage systems from being lost in the event of a disaster. The replicated data on secondary network storage system 245 allows for recovery of the data in the event of a disaster, as will be described below.

A disaster recovery policy (e.g., DR plan 212) may define the frequency of both backups of virtual machine 220 (i.e., snapshots stored in primary network storage system 240) and replications to secondary network storage system 245. A user, system administrator, or the system itself may set intervals for the backups and replication. The intervals may be based on a number of factors, including the nature of the data, available network bandwidth, and other factors. DR services 210 may retrieve this information (e.g., by making API calls) from host machine 230 and use it to create DR plan 212.

When data protection software module 270 initiates a back up of data for virtual machine 220, it also stores backup metadata with the snapshot. The backup metadata may include various pieces of information including, a virtual machine identifier, an identifier of the host machine on which the virtual machine was running (e.g., a host name), an indication of when the snapshot was taken, and other information. For virtual machine 220, running on primary host machine 230, the backup metadata will reference primary host machine 230. This backup metadata is also replicated to secondary network storage system 245 along with the virtual machine data.

In the event of a disaster, leading to the loss of data in primary network storage system 240, it is advantageous to restore the lost data from secondary network storage system 245. The disaster may include all host machines at the primary site failing, all storage systems at the primary site failing, or complete site failure, attributable, for example, to a natural disaster. In the event of a disaster, DR services 210 initiates a restore of the virtual machine data replicated to secondary network storage system 245. DR services 210 may make an API call for an API published by data protection software module 272 in order to initiate the restore to alternate host operation. The backup metadata, stored with the data from virtual machine 220, will indicate that the virtual machine was previously hosted by primary host machine 230. Due to the failure at the primary site, however, the virtual machine is restored on an alternate host (e.g., secondary host machine 235). The alternate host that is the target of the restore operation may be defined by DR services 210 in DR plan 212. DR services 210, thus includes a mechanism to cause the restore operation to ignore the references to primary host machine 230 in the backup metadata and instead restore the virtual machine on secondary host machine 235. Additional details of the restore to alternate host operation are provided below.

Figure 3A:
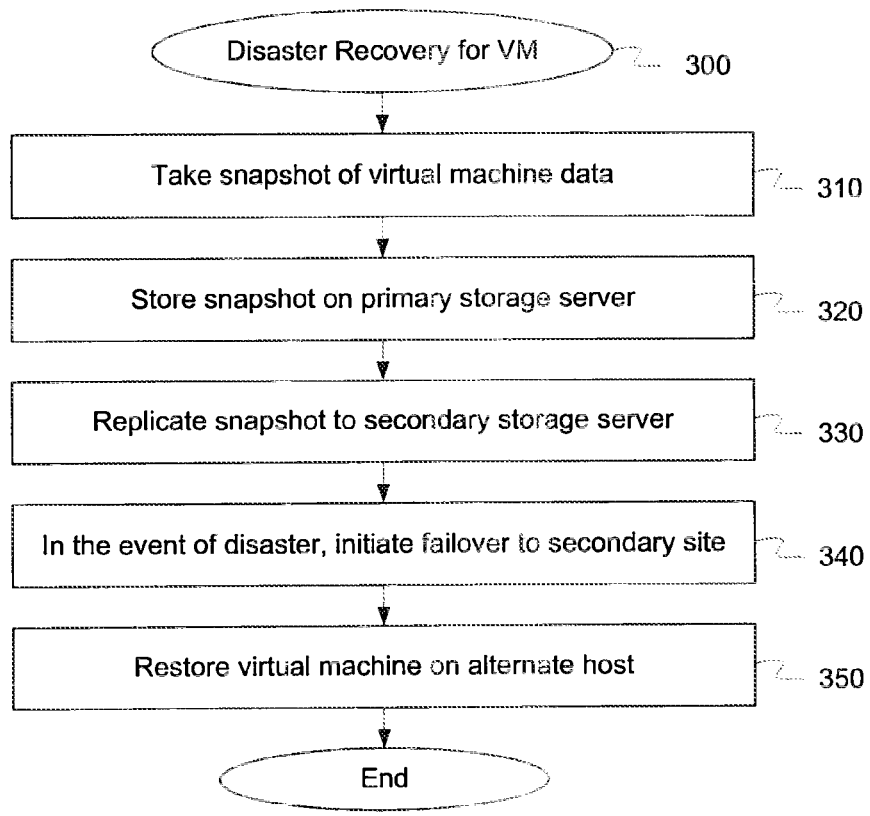
FIG. 3A is a flow chart illustrating a method for disaster recovery for a virtual machine environment according to an embodiment.

FIG. 3A is a flow chart illustrating a method for disaster recovery in a virtual machine environment according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 300 is performed by DR services 210 in connection with data protection software module 270 and replication software module 280 of FIG. 2.

Referring to FIG. 3A, at block 310, method 300 performs a backup of a virtual machine. Data protection software module 270, running in primary host machine 230, captures a persistent point-in-time image of the virtual machine 220. The image may represent a snapshot of the data stored by virtual machine 220 at the instant the backup is performed. At block 320, method 300 stores the snapshot in primary network storage system 240. In one embodiment, data protection software module 270 stores the snapshot of virtual machine 220 in a dedicated volume 260 in primary network storage system 240.

At block 330, method 300 replicates the snapshot stored in volume 260 on primary network storage system 240 to a secondary network storage system 245. Replication software module 280 may form a mirroring relationship with replication software module 282 on the secondary network storage system 245 to mirror all data stored in primary network storage system 240 to secondary network storage system 245. The snapshot stored in volume 260 may be mirrored to identical volume 262 on secondary network storage system 245.

Alternatively, replication software module 280 may use an existing mirroring relationship established with replication software module 282.

In the event of a disaster causing failure of either the primary host machine 230 or primary network storage system 240, at block 340, method 300 initiates a failover operation to migrate operations from the primary site to a secondary site. In one embodiment, the secondary site includes secondary host machine 235 and secondary network storage server 245. Data protection software module 272 on secondary host machine 235 may receive instructions from network administrator or from DR services 210 to initiate the failover. Data protection software module 272 executes a series of instructions to cause secondary host machine 235 and secondary network storage system 245 to take over the operations from the primary site. In one embodiment, during the failover process, DR services 210 breaks the mirror relationship with replication software 280 on primary network storage system 240. DR services 210 takes the secondary network storage system offline, brings it back online and scans for disks or volumes containing backup data, such as volume 262.

Upon identifying backup data, at block 350, method 300 restores any virtual machines having backup data on an alternate host. In one embodiment, data protection software 272 restores the virtual machine on secondary host machine 235. However, in other embodiments, data protection software 272 restores the virtual machine on another host machine.

Figure 3B:
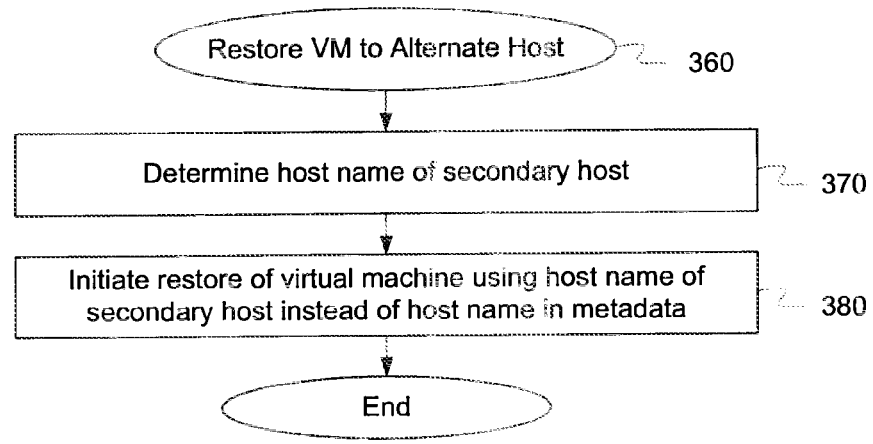
FIG. 3B is a flow chart illustrating a method for restoring a virtual machine to an alternate host according to an embodiment.

FIG. 3B is a flow chart illustrating a method for restoring a virtual machine to an alternate host according to an embodiment. The method 360 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 360 is performed by DR services 210 in connection with data protection software module 270 of FIG. 2.

Referring to FIG. 3A, at block 370, method 360 determines a host name of a secondary host on which the virtual machine is to be restored. In one embodiment, DR services 210 provides the host name of secondary host machine 235. The host name may be retrieved from DR plan 212, where it was input, for example by a system administrator. In another embodiment, DR plan 212 may include a number of different alternate host names, and DR services 210 may provide any available host name from DR plan 212.

At block 380, method 300 initiates a restore operation using the host name determined at block 370 instead of the host name in the backup metadata associated with the snapshot. As discussed above, DR services 210 initiates a back up of data for virtual machine 220 through data protection software module 270, it also stores backup metadata with the snapshot. This backup metadata includes a host name identifying the host machine on which the virtual machine was running (i.e., primary host machine 230) when the backup was taken. The restore operation generally accesses a specified field in the backup metadata where the host name is stored. However, during the restore to alternate host operation, DR services 210, through data protection software module 272, causes the restore operation to ignore the host name in the backup metadata and instead provides the host name identified at block 370 as the designated host on which to restore the virtual machine. The restore operation retrieves the necessary data from the snapshot on secondary network storage system 245 and restores the virtual machine on the designated host machine (e.g., secondary host machine 235). In one embodiment, DR services 210 initiates the restore to alternate host operation by calling a web service API. Data protection software module 272 provides the host name of the designated host machine and the web service API restores the virtual machine on the designated host. The web service API may be accessible over a wide area network 290 such as the Internet.

Figure 4:
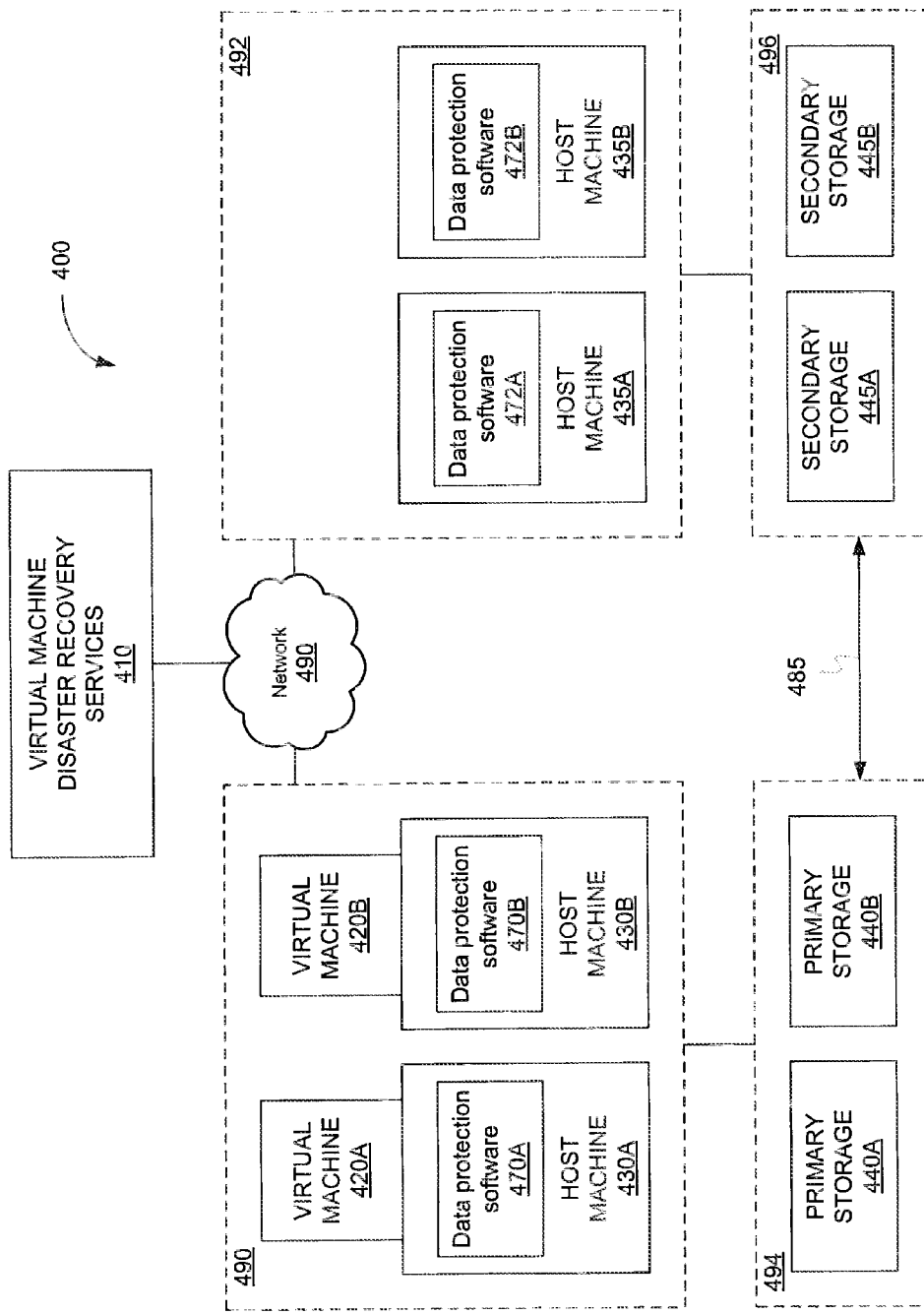
FIG. 4 is a block diagram illustrating a clustered network environment in which disaster recovery may be implemented according to an embodiment.

FIG. 4 is a block diagram illustrating a clustered network environment in which disaster recovery may be implemented according to an embodiment. The clustered network environment 400 includes a first host cluster 490, a second host cluster 492, a first storage cluster 494, and a second storage cluster 496. In one embodiment, first host cluster 490 includes primary host machines 430A, 430B, second host cluster 492 includes secondary host machines 435A, 435B, first storage cluster 494 includes primary network storage systems 440A, 440B, and second storage cluster 496 includes secondary network storage systems 445A, 445B. Clustered network environment 400 may also virtual machines 420A, 420B running on a host machine (i.e., primary host machine 430A, 430B). In one embodiment, each of host machines 430A, 430B, 435A and 435B include data protection software modules (470A, 470B, 472A and 472B, respectively) running data protection software. Other embodiments may include any number of clusters, physical host machines, network storage systems, and/or virtual machines.

Disaster recovery in clustered network environment 400 operates similarly to non-clustered network environment 200 discussed above with reference to FIG. 2. As in the previous embodiment, each of network storage systems 440A, 440B, 445A and 445B include replication software modules (not shown) running replication software. In this embodiment, the replication software modules create a data protection relationship between each network storage system in first storage cluster 494 and each network storage system in second storage cluster 496. For example, disaster recovery services 410, through replication software forms a mirror relationship 485 between primary network storage system 440A and either of secondary network storage systems 445A, 445B in first cluster 496. Replication software may also form a similar mirror relationship between each of secondary network storage systems 445A, 445B in second storage cluster 496 and any network storage system in first storage cluster 494.

In one embodiment, in the event of a failure wiping out all or part of first host cluster 490, including primary host machine 430A or primary host machine 430B, or first storage cluster 494, DR services 410, through data protection software module 472A or 472B running on secondary host machine 435A or 435B, may initiate a restore of the virtual machine data replicated to secondary network storage system 445A or 445B, for example by making an API call. DR services 410 initiates a restore to alternate host operation, and causes the restore operation to ignore the host name in the backup metadata and instead provides the host name of secondary host machine 435A or 435B as the designated host on which to restore the virtual machine. The restore operation retrieves the necessary data from the snapshot on secondary network storage system 445A or 445B and restores the virtual machine on the designated host machine (e.g., secondary host machine 435A or 435B).

Figure 5A:
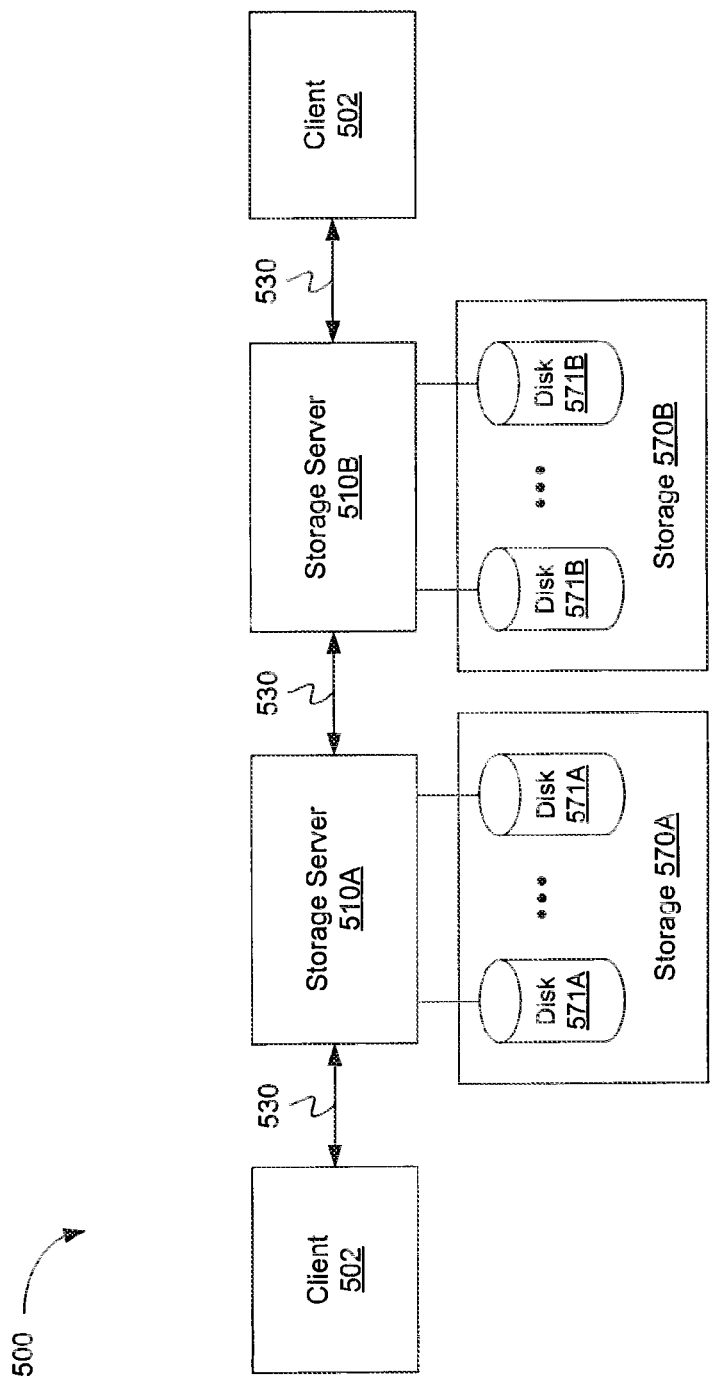
FIG. 5A is a block diagram illustrating a network storage system in which disaster recovery may be implemented according to an embodiment.

FIG. 5A shows a network storage system 500 in which disaster recovery can be implemented in one embodiment. The network storage system 500 may be similar to network environment 200, shown in FIG. 2. In FIG. 5A, storage servers 510 (storage servers 510A, 510B) each manage multiple storage units 570 (storage 570A, 570B) that include mass storage devices. These storage servers provide data storage services to one or more clients 502 through a network 530. Network 530 may be, for example, a local area network (LAN), wide area network (WAN), metropolitan area network (MAN), a global area network such as the Internet, a Fibre Channel fabric, or any combination of such interconnects. Each of clients 502 may be, for example, a conventional personal computer (PC), server-class computer, workstation, handheld computing or communication device, or other special or general purpose computer.

Storage of data in storage units 570 is managed by storage servers 510 which receive and respond to various read and write requests from clients 502, directed to data stored in or to be stored in storage units 570. Storage units 570 constitute mass storage devices which can include, for example, flash memory, magnetic or optical disks, or tape drives, illustrated as disks 571 (disks 571A, 571B). The storage devices 571 can further be organized into arrays (not illustrated) implementing a Redundant Array of Inexpensive Disks/Devices (RAID) scheme, whereby storage servers 510 access storage units 570 using one or more RAID protocols known in the art.

Storage servers 510 can provide file-level service such as used in a network-attached storage (NAS) environment, block-level service such as used in a storage area network (SAN) environment, a service which is capable of providing both file-level and block-level service, or any other service capable of providing other data access services. Although storage servers 510 are each illustrated as single units in FIG. 5A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 5B and embodiments of a D-module and an N-module are described further below with respect to FIG. 7.

In yet other embodiments, storage servers 510 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

In the embodiment of FIG. 5A, one of the storage servers (e.g., storage server 510A) functions as a primary provider of data storage services to client 502. Data storage requests from client 502 are serviced using disks 571A organized as one or more storage objects. A secondary storage server (e.g., storage server 510B) takes a standby role in a mirror relationship with the primary storage server, replicating storage objects from the primary storage server to storage objects organized on disks of the secondary storage server (e.g., disks 570B). In operation, the secondary storage server does not service requests from client 502 until data in the primary storage object becomes inaccessible such as in a disaster with the primary storage server, such event considered a failure at the primary storage server. Upon a failure at the primary storage server, requests from client 502 intended for the primary storage object are serviced using replicated data (i.e. the secondary storage object) at the secondary storage server.

It will be appreciated that in other embodiments, network storage system 500 may include more than two storage servers. In these cases, protection relationships may be operative between various storage servers in system 500 such that one or more primary storage objects from storage server 510A may be replicated to a storage server other than storage server 510B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 510 should be taken as illustrative only.

Figure 5B:
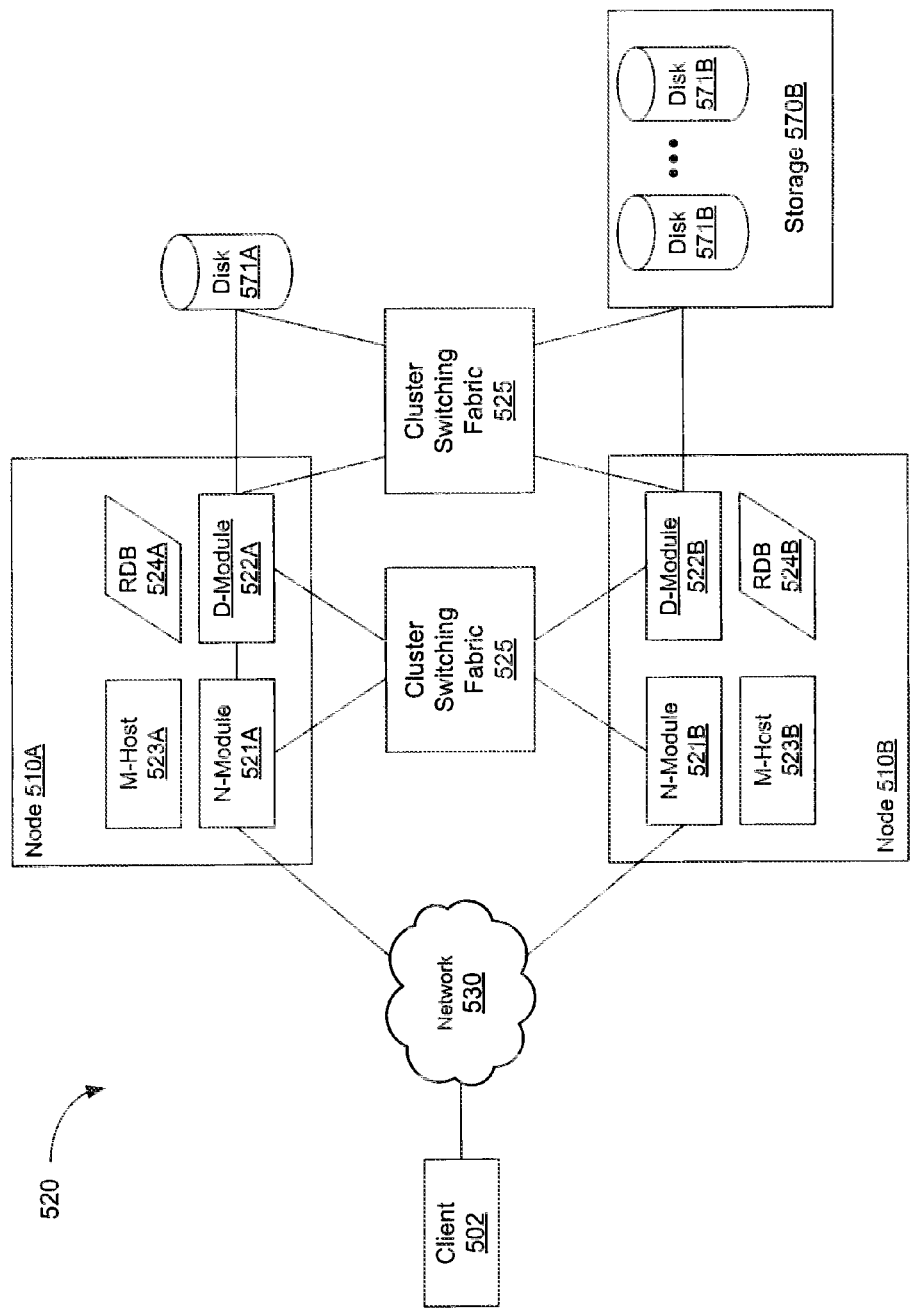
FIG. 5B is a block diagram illustrating a distributed or clustered architecture for a network storage system in which disaster recovery may be implemented according to an embodiment.

FIG. 5B illustrates block diagram of a distributed or clustered network storage system 520 which may implement disaster recovery in one embodiment. The distributed network storage system 520 may be similar to clustered network environment 400 shown in FIG. 4. In FIG. 5B, system 520 may include storage servers implemented as nodes 510 (nodes 510A, 510B), which are each configured to provide access to storage devices 571. In FIG. 5B, nodes 510 are interconnected by a cluster switching fabric 525, which may be embodied as an Ethernet switch.

Nodes 510 may be operative as multiple functional components that cooperate to provide a distributed architecture of system 520. To that end, each node 510 may be organized as a network element or module (N-module 521A, 521B), a disk element or module (D-module 522A, 522B), and a management element or module (M-host 523A, 523B). In one embodiment, each module includes a processor and memory for carrying out respective module operations. For example, N-module 521 may include functionality that enables node 510 to connect to client 502 via network 530 and may include protocol components such as a media access layer, Internet Protocol (IP) layer, Transport Control Protocol (TCP) layer, User Datagram Protocol (UDP) layer, and other protocols known in the art.

In contrast, D-module 522 may connect to one or more storage devices 571 via cluster switching fabric 525 and may be operative to service access requests on devices 571. In one embodiment, the D-module 522 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 5B, a storage abstraction layer (e.g., file system) of the D-module divides the physical storage of devices 571 into storage objects. Requests received by node 510 (e.g., via N-module 521) may thus include storage object identifiers to indicate a storage object on which to carry out the request.

Also operative in node 510 is M-host 523 which provides cluster services for node 510 by performing operations in support of a distributed storage system image, for instance, across system 520. M-host 523 provides cluster services by managing a data structure such as a RDB 524 (RDB 524A, 524B), which contains information used by N-module 521 to determine which D-module 522 "owns" (services) each storage object. The various instances of RDB 524 across respective nodes 510 may be updated regularly by M-host 523 using conventional protocols operative between each of the M-hosts (e.g., across network 530) to bring them into synchronization with each other. A client request received by N-module 521 may then be routed to the appropriate D-module 522 for servicing to provide a distributed storage system image.

It should be noted that while FIG. 5B shows an equal number of N-modules and D-modules constituting a node in the illustrative system, there may be different number of N-modules and D-modules constituting a node in accordance with various embodiments of disaster recovery. For example, there may be a number of N-modules and D-modules of node 510A that does not reflect a one-to-one correspondence between the N-modules and D-modules of node 510B. As such, the description of a node comprising one N-module and one D-module for each node should be taken as illustrative only.

Figure 6:
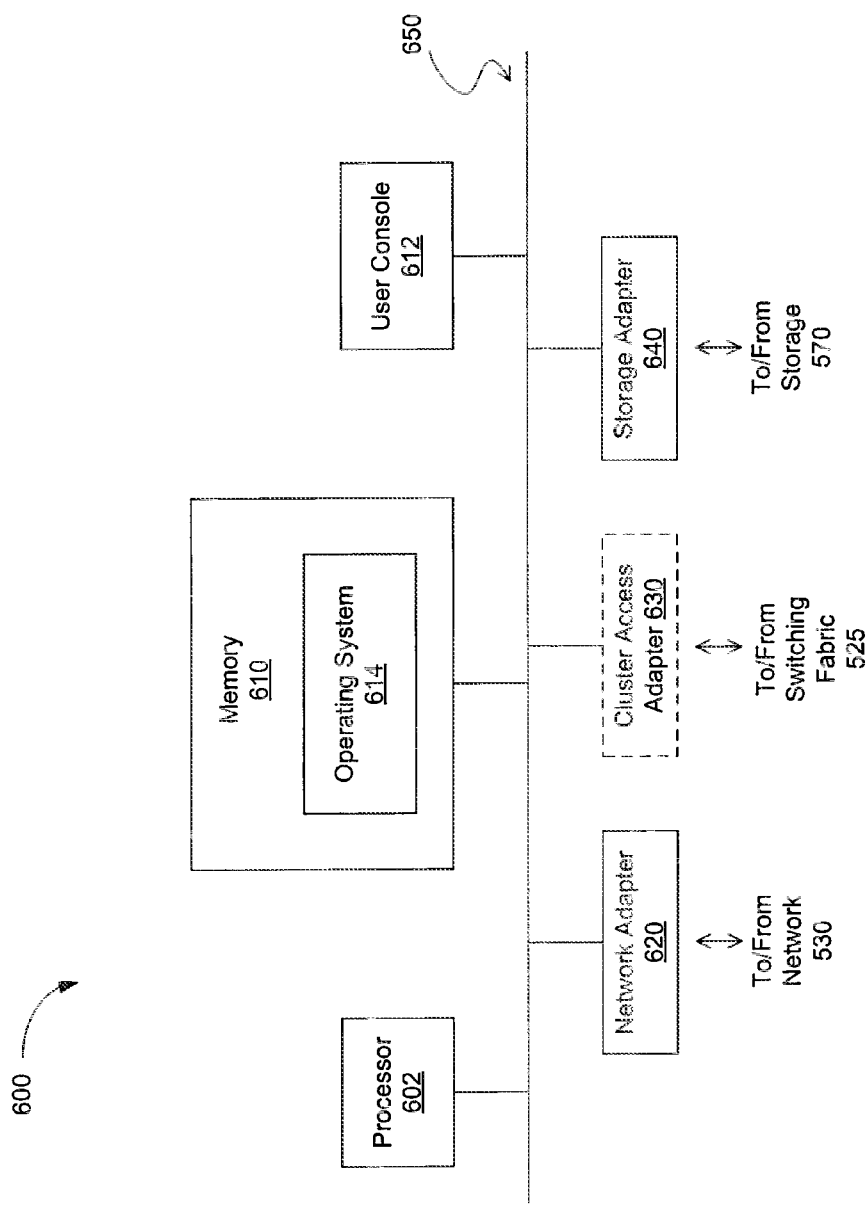
FIG. 6 is a block diagram illustrating a hardware architecture of a storage system in which disaster recovery may be implemented according to an embodiment.

FIG. 6 is a block diagram of an embodiment of a storage server, such as storage servers 510A and 510B of FIG. 5A, embodied as a general or special purpose computer including a processor 602, a memory 610, a user console 612, a network adapter 620, and a storage adapter 640 interconnected by a system bus 650, such as a convention Peripheral Component Interconnect (PCI) bus.

Memory 610 includes storage locations addressable by processor 602, network adapter 620 and storage adapter 640 for storing processor-executable instructions and data structures associated with disaster recovery. A storage operating system 614, portions of which are typically resident in memory 610 and executed by processor 602, functionally organizes the storage server by invoking operations in support of the storage services provided by the storage server. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 602 and executable software can be implemented by hardware, such as integrated currents configured as programmable logic arrays, ASICs, and the like.

Network adapter 620 comprises one or more ports to couple the storage server to one or more clients over point-to-point links or a network. Thus, network adapter 620 includes the mechanical, electrical and signaling circuitry needed to couple the storage server to one or more clients over a network. Each client may communicate with the storage server over the network by exchanging discrete frames or packets of data according to pre-defined protocols, such as TCP/IP.

Storage adapter 640 includes a plurality of ports having input/output (I/O) interface circuitry to couple the storage devices (e.g., disks) to bus 621 over an I/O interconnect arrangement, such as a conventional high-performance FC or SAS link topology. Storage adapter 640 typically includes a device controller (not illustrated) comprising a processor and a memory for controlling the overall operation of the storage units in accordance with read and write commands received from storage operating system 614. As used herein, data written by a device controller in response to a write command is referred to as "write data," whereas data read by device controller responsive to a read command is referred to as "read data."

User console 612 enables an administrator to interface with the storage server to invoke operations and provide inputs to the storage server using a command line interface (CLI) or a graphical user interface (GUI). In one embodiment, user console 612 is implemented using a monitor and keyboard.

When implemented as a node of a cluster, such as cluster 120 of FIG. 1B, the storage server further includes a cluster access adapter 630 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

FIG. 7 is a block diagram of a storage operating system, such as storage operating system 614 of FIG. 6, which implements disaster recovery. The storage operating system 700 comprises a series of software layers executed by a processor, such as processor 602 of FIG. 6, and organized to form an integrated network protocol stack or, more generally, a multi-protocol engine 725 that provides data paths for clients to access information stored on the storage server using block and file access protocols.

Multi-protocol engine 725 includes a media access layer 712 of network drivers (e.g., gigabit Ethernet drivers) that interface with network protocol layers, such as the IP layer 714 and its supporting transport mechanisms, the TCP layer 716 and the User Datagram Protocol (UDP) layer 715. A file system protocol layer provides multi-protocol file access and, to that end, includes support for the Direct Access File System (DAFS) protocol 718, the NFS protocol 720, the CIFS protocol 722 and the Hypertext Transfer Protocol (HTTP) protocol 724. A VI layer 726 implements the VI architecture to provide direct access transport (DAT) capabilities, such as RDMA, as required by the DAFS protocol 718. An iSCSI driver layer 728 provides block protocol access over the TCP/IP network protocol layers, while a FC driver layer 730 receives and transmits block access requests and responses to and from the storage server. In certain cases, a Fibre Channel over Ethernet (FCoE) layer (not shown) may also be operative in multi-protocol engine 725 to receive and transmit requests and responses to and from the storage server. The FC and iSCSI drivers provide respective FC- and iSCSI-specific access control to the blocks and, thus, manage exports of LUNS to either iSCSI or FCP or, alternatively, to both iSCSI and FCP when accessing blocks on the storage server.

The storage operating system also includes a series of software layers organized to form a storage server 765 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement involves logical volume block number (vbn) spaces, wherein each volume is associated with a unique vbn.

File system 760 implements a virtualization system of the storage operating system through the interaction with one or more virtualization modules (illustrated as a SCSI target module 735). SCSI target module 735 is generally disposed between drivers 728, 730 and file system 760 to provide a translation layer between the block (LUN) space and the file system space, where LUNs are represented as blocks. In one embodiment, file system 760 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 760 uses files to store metadata describing the layout of its file system, including an inode file, which directly or indirectly references (points to) the underlying data blocks of a file. In one embodiment, replication software module 282 resides within file system 760.

Operationally, a request from a client is forwarded as a packet over the network and onto the storage server where it is received at a network adapter. A network driver such as layer 712 or layer 730 processes the packet and, if appropriate, passes it on to a network protocol and file access layer for additional processing prior to forwarding to file system 760. There, file system 760 generates operations to load (retrieve) the requested data from the disks if it is not resident "in core". i.e., in memory 623. If the information is not in memory, file system 760 accesses the inode file to retrieve a logical vbn and passes a message structure including the logical vbn to the RAID system 780. There, the logical vbn is mapped to a disk identifier and device block number (dbn) and sent to an appropriate driver of disk driver system 790. The disk driver accesses the dbn from the specified disk and loads the requested data block(s) in memory for processing by the storage server. Upon completion of the request, the node (and operating system 700) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path is implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 620, 640 are configured to offload some or all of the packet processing and storage access operations, respectively, from processor 602, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 750 for accessing data stored on disk. In contrast, multi-protocol engine 725 may be embodied as N-module 710 to perform protocol termination with respect to a client issuing incoming access over the network, as well as to redirect the access requests to any other N-module in the cluster. A cluster services system 736 may further implement an M-host (e.g., M-host 701) to provide cluster services for generating information sharing operations to present a distributed file system image for the cluster. For instance, media access layer 712 may send and receive information packets between the various cluster services systems of the nodes to synchronize the replicated databases in each of the nodes.

In addition, a cluster fabric (CF) interface module 740 (CF interface modules 740A, 740B) may facilitate intra-cluster communication between N-module 710 and D-module 750 using a CF protocol 770. For instance, D-module 750 may expose a CF application programming interface (API) to which N-module 710 (or another D-module not shown) issues calls. To that end, CF interface module 740 can be organized as a CF encoder/decoder using local procedure calls (LPCs) and remote procedure calls (RPCs) to communicate a file system command to between D-modules residing on the same node and remote nodes, respectively.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
indicating, from a disaster recovery services module to a first data protection module via a network, that a snapshot of a virtual machine should be stored in a primary network storage system, wherein a primary host machine comprises the first data protection module, wherein the primary host machine is coupled with the primary network storage system, wherein the virtual machine is executing on the primary host machine;
storing, by the primary host machine, the snapshot of the virtual machine on one or more storage devices in the primary network storage system, wherein the snapshot of the virtual machine represents a state of the virtual machine at the time of the snapshot;
replicating the snapshot of the virtual machine from the primary network storage system to a secondary network storage system;
detecting, by the disaster recovery services module, a failure of at least one of the primary host machine or the primary network storage system;
in response to detecting the failure of at least one of the primary host machine and the primary network storage system,
determining, by the disaster recovery services module, a secondary host machine, wherein the secondary host machine is coupled with the secondary network storage system, wherein the secondary host machine comprises a second data protection module; and
indicating, from the disaster recovery services module to the second data protection module via the network, that the virtual machine should be restored to the secondary host machine; and
restoring, by the second data protection module, the virtual machine to the secondary host machine based, at least in part, on the snapshot of the virtual machine replicated to the secondary network storage system, wherein restoring the virtual machine to the secondary host machine begins execution of the virtual machine on the secondary host machine at the state of the virtual machine at the time of the snapshot.

2. The method of claim 1, wherein the snapshot of the virtual machine comprises a persistent point-in-time image of the virtual machine.

3. The method of claim 2, wherein said replicating the snapshot of the virtual machine from the primary network storage system to the secondary network storage system comprises mirroring the persistent point-in-time image to one or more storage devices in the secondary network storage system.

4. The method of claim 1, further comprising:
storing metadata associated with the snapshot of the virtual machine on one or more storage devices in the primary network storage system, the metadata comprising a host name of the primary host machine.

5. The method of claim 4, further comprising:
replicating the metadata from the primary network storage system to the secondary network storage system.

6. The method of claim 5, further comprising:
determining a host name of the secondary host machine.

7. The method of claim 6, wherein said restoring the virtual machine to the secondary host machine comprises:
replacing the host name of the primary host machine in the metadata with the host name of the secondary host machine.

8. A system comprising:
a device comprising a disaster recovery services module and a first processor, the disaster recovery services module comprising a first machine readable storage medium having program code stored therein that is executable by the first processor to cause the device to,
indicate, to a first data protection module via a network, that a snapshot of a virtual machine should be stored in a primary network storage system;
detect a failure of at least one of a primary host machine or the primary network storage system; and
in response to detection of a failure of at least one of the primary host machine or the primary network storage system, indicate, to a second data protection module via the network, that the virtual machine should be restored to the secondary host machine;
the primary host machine coupled with the primary network storage system, the primary host machine comprising the first data protection module and a second processor, the primary host machine configured to execute the virtual machine,
wherein the first data protection module comprises a second machine readable storage medium having program code stored therein that is executable by the second processor to cause the primary host machine to,
store the snapshot of the virtual machine to the primary network storage system, wherein the snapshot of the virtual machine represents a state of the virtual machine at the time of the snapshot;
the primary network storage system comprising a first set of one or more storage devices, the primary network storage system configured to replicate the snapshot of the virtual machine from the primary network storage system to a secondary network storage system;
the secondary network storage system comprising a second set of one or more storage devices; and
the secondary host machine coupled with the secondary network storage system, the secondary host machine comprising the second data protection module and a third processor, the secondary host machine configured to execute the virtual machine,
wherein the second data protection module comprises a third machine readable storage medium having program code stored therein that is executable by the third processor to cause the secondary host machine to,
restore the virtual machine to the secondary host machine based, at least in part, on the snapshot of the virtual machine replicated to the secondary network storage system, wherein restoration of the virtual machine to the secondary host machine begins execution of the virtual machine on the secondary host machine at a state of the virtual machine at the time of the snapshot.

9. The system of claim 8, wherein the snapshot of the virtual machine comprises a persistent point-in-time image of the virtual machine.

10. The system of claim 9, wherein the primary network storage system being configured to replicate the snapshot of the virtual machine from the primary network storage system to the secondary network storage system comprises the primary network storage system being configured to mirror the persistent point-in-time image to the secondary network storage system.

11. The system of claim 8, wherein the program code executable by the second processor further comprises program code executable by the second processor to cause the primary data host machine to:
store metadata associated with the snapshot of the virtual machine to the primary network storage system, the metadata comprising a host name of the primary host machine.

12. The system of claim 11, wherein the primary network storage system is further configured to:
replicate the metadata from the primary network storage system to the secondary network storage system.

13. The system of claim 12, wherein when the program code being executable by the third processor to cause the secondary host machine to restore the virtual machine to the secondary host machine comprises program code executable by the third processor to cause the secondary host machine to:
determine a hostname associated with the secondary host machine; and
replace the host name of the primary host machine in the metadata with the host name of the secondary host machine.

14. A device comprising:
a processor; and
a machine readable storage medium having program code stored therein that is executable by the processor to cause the device to,
indicate, via a network, to a first data protection module on a primary host machine, that a snapshot of a virtual machine should be stored in a primary network storage system coupled with the primary host machine, wherein the virtual machine is executing on the primary host machine at the time of said indication, wherein the snapshot of the virtual machine represents a state of the virtual machine at the time of the snapshot;
detect a failure of at least one of the primary host machine or the primary network storage system; and
in response to detection of a failure of at least one of the primary host machine or the primary network storage system,
determine a secondary host machine, wherein the secondary host machine is configured to execute the virtual machine; and
indicate, via the network, to a second data protection module, that the virtual machine should be restored to the secondary host machine based, at least in part, on a backup of the snapshot of the virtual machine stored in a secondary network storage system, wherein restoring the virtual machine to the secondary host machine results begins execution of the virtual machine on the secondary host machine at the state of the virtual machine at the time of the snapshot.

15. The device of claim 14, wherein the snapshot of the virtual machine comprises a persistent point-in-time image of the virtual machine.

16. The device of claim 15, wherein the program code further comprises program code executable by the processor to cause the device to indicate, to the first data protection module via the network, that the snapshot of the virtual machine should be replicated to the secondary network storage system.

17. The device of claim 14, wherein the program code further comprises program code executable by the processor to cause the device to determine a host name of the secondary host machine in response to determination of the secondary host machine.

18. The device of claim 17, wherein the program code being executable by the processor to cause the device to indicate, to the second data protection module via the network that the virtual machine should be restored to the secondary host machine comprises program code executable by the processor to cause the device to:
indicate that the host name of the primary host machine in backup metadata associated with the snapshot of the virtual machine should be replaced with the host name of the secondary host machine.

19. A method comprising:
initiating, via a network, by a disaster recovery services module executing on a device, storage of a snapshot of a virtual machine in a primary network storage system, the virtual machine running on a primary host machine coupled with the primary network storage system;
initiating, via the network, by the disaster recovery services module, replication of the snapshot of the virtual machine from the primary network storage system to a secondary network storage system, the secondary network storage system coupled with a secondary host machine; and
in response to detecting a failure of at least one of the primary host machine or the primary network storage system, initiating, via the network by the disaster recovery services module, restoration of the virtual machine to the secondary host machine based, at least in part on, the replicated snapshot of the virtual machine in the secondary network storage system, wherein said restoration of the virtual machine begins execution of the virtual machine on the secondary host machine at the state of the virtual machine at the time of the snapshot.

20. The system of claim 8,
wherein the program code being executable by the first processor further comprises program code executable by the first processor to cause the device to indicate, to the first data protection module via a network, that the snapshot of the virtual machine should be replicated to the secondary network storage system;
wherein the program code being executable by the second processor further comprises program code executable to cause the primary host machine to indicate, to the primary network storage system, that the snapshot of the virtual machine should be replicated to the secondary network storage system in response to reception of the indication, from the device, that the snapshot of the virtual machine should be replicated to the secondary network storage system.

21. The system of claim 12, wherein when the program code being executable by the first processor to cause the device to indicate that the virtual machine should be restored to the secondary host machine comprises program code executable by the first processor to cause the device to replace the host name of the primary host machine in the metadata with the determined host name of the secondary host machine.

22. The device of claim 17, wherein the program code being executable by the processor to cause the device to indicate, to the second data protection module via the network that the virtual machine should be restored to the secondary host machine comprises program code executable by the processor to cause the device to replace the host name of the primary host machine in backup metadata associated with the snapshot of the virtual machine with the host name of the secondary host machine.

* * * * *